J. A. MOXEY.
REMOVABLE STANDARD FOR WAGON BOLSTERS.
APPLICATION FILED AUG. 13, 1917.
1,312,343.
Patented Aug. 5, 1919.
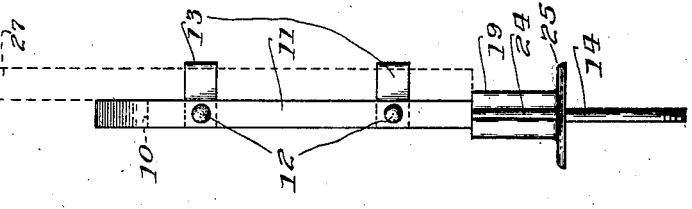
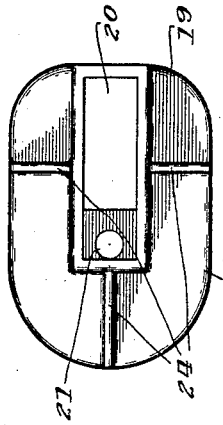
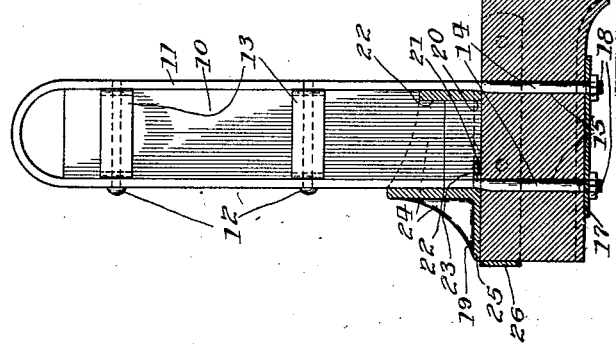
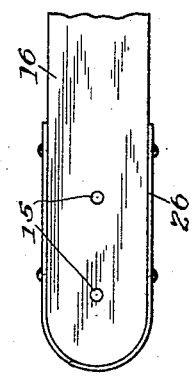
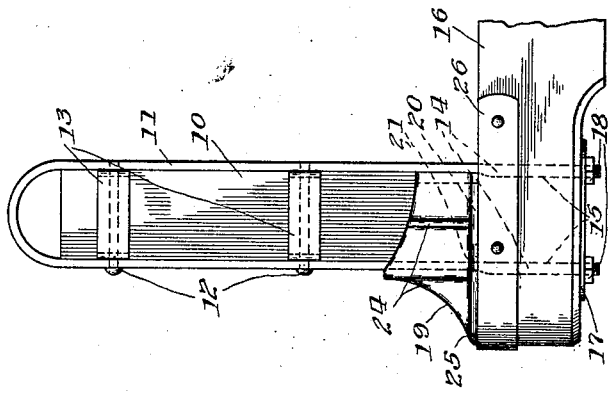
Inventor.
James A. Moxey,
by Chas. E. Lord
Atty.

UNITED STATES PATENT OFFICE.

JAMES A. MOXEY, OF CHICAGO ILLINOIS, ASSIGNOR, BY MESNE ASSIGNMENTS, TO INTERNATIONAL HARVESTER COMPANY, A CORPORATION OF NEW JERSEY.

REMOVABLE STANDARD FOR WAGON-BOLSTERS.

1,312,343.  Specification of Letters Patent.  Patented Aug. 5, 1919.

Application filed August 13, 1917. Serial No. 185,939.

*To all whom it may concern:*

Be it known that I, JAMES A. MOXEY, a citizen of the United States, residing at Chicago, in the county of Cook and State of Illinois, have invented certain new and useful Improvements in Removable Standards for Wagon-Bolsters, of which the following is a full, clear, and exact specification.

This invention relates to removable standards for wagon bolsters.

The objects of the invention are to provide a standard which may be easily removed and quickly secured in place on the bolster; the construction of the standard being such that it will withstand in a most efficient manner the strains and stresses to which it is subject when in place on the bolster.

In the accompanying drawings I have illustrated one embodiment of my invention, and in these drawings—

Figure 1 shows a side elevation of the outer end of a wagon bolster with my improved standard in place thereon;

Fig. 2 is a longitudinal section of the bolster and standard shown in Fig. 1;

Fig. 3 is a top plan view of the outer end of the bolster;

Fig. 4 is a top plan view of the malleable bracket or socket used in connection with the standard; and Fig. 5 is an end elevation of the standard, showing also an extension stake carried thereby.

The standard is made up of three essential parts; namely, the strap, the stake, and the bracket or socket. The stake 10, preferably formed of hard wood, such as oak, is surrounded by the U-shaped strap 11, which is secured thereto by means of rivets 12, passing transversely through the stake and through the two longitudinal side portions of the strap. The side edges of the stake are recessed to provide for the reception of loops 13, which are secured by the rivets 12 above mentioned and are held firmly in place in this recess by the longitudinal portions of the strap 11. This strap 11 is extended below the stake 10 in the form of shank portions 14 screw threaded on their ends, and these shank portions extend through apertures 15 in the wagon bolster 16, a wearing plate 17 being secured between the nuts 18 on the screw threaded extensions of the shanks and the bolster 16. The bracket or socket 19, formed preferably of malleable iron, is secured to the lower end of the stake 10 by a driving fit and is provided with an aperture 20 which receives a portion of the lower end of the stake 10, and also with an aperture 21 through which one of the shanks 14 of the strap 11 passes. As is clearly illustrated in Fig. 2, the stake 10 is cut away at 22 and 23 to permit the securing of the bracket or socket 19 in place thereon. It will be noted that this bracket is provided with laterally extending ribs 24 extending from the upper vertical surface of the bracket to the outer edge of a lateral flange 25, which is formed on three sides of the bracket. The bolster 16 is provided on its upper surface with a wearing plate 26 against which the flanged lower surface 25 of the bracket bears when the standard is in place on the bolster. As is well-known, the standard may be provided with the usual extension stake 27, which is held in place by the loops 13 above described.

From the above description, and from the drawings, it will be seen that I have provided a standard which may be easily removed and quickly secured in place on the bolster, it being necessary merely to drill two holes 15 in the bolster, after which the shanks 14 may be passed therethrough and the stake may be secured in position by the nuts 18. Should another size of stake be desired, the nuts 18 are loosened and the stake is removed and the desired size bolted into place on the bolster. The bracket 25, which is mounted on the lower end of the stake, forms a rigid base for the same and the flange 25 and ribs 24 brace the standard and secure it firmly against displacement. By the use of a standard of this form I also do away with mortising the bolster, which materially weakens the same.

While I have in the above specification described one embodiment of my invention, it will be understood that various modifications may be made without departing from the spirit of the invention as expressed by the following claims.

What I claim as new is:

1. In a standard, a stake, a U-shaped strap secured thereto and provided with downwardly extending shank portions, and a bracket inclosing the lower end of said stake and a portion of said strap.

2. In a standard, a stake, a U-shaped strap secured to said stake, said strap having shank portions extending downwardly beyond said stake, and a bracket secured to said stake and having walls surrounding the same and flanges extending laterally therefrom.

3. In a standard, a stake, loops carried thereby, a U-shaped strap secured to said stake and said loops, said strap having shank portions extending downwardly beyond the stake, and a bracket having a flat bearing surface and vertical walls secured to and surrounding said stake, said bracket having apertures for receiving a portion of said stake and one of said shank portions.

4. In a standard, a stake, a U-shaped strap secured thereto and having shank portions extending downwardly beyond said stake, and a bracket provided with a socket for receiving said stake, lateral flanges extending outwardly therefrom, and ribs extending upwardly and inwardly from said lateral flanges.

5. In a standard, a stake, a U-shaped strap surrounding the same, said stake having recesses in its longitudinal edges, loops carried by said recesses, means for securing said strap and said loops to said stake, said strap having shank portions extending downwardly beyond said stake, and a bracket secured to said stake and surrounding said stake and a portion of said strap.

6. In a standard, a stake, a socket bracket in which the lower end of said stake is located, and means attached to and extending on a plurality of sides of the stake for fastening the stake and socket bracket to a supporting member.

7. In a standard, a stake, a metallic socket bracket receiving the lower end of said stake, and a member secured to said stake and securing said stake and bracket to a supporting member, said first named member constituting the sole securing means for said stake and bracket.

8. In a standard, a stake, a socket bracket in which the lower end of said stake is located, and a U-shaped strap attached to said stake and passing through the socket bracket for fastening the stake and bracket to a supporting member.

9. In a standard, a wooden stake, a metallic socket bracket receiving the lower end of said stake, and a metallic member embracing said stake and securing said stake and bracket to a supporting member.

10. In combination, a supporting member, a metallic socket bracket resting thereon but not directly secured thereto, a stake seated in said bracket, and means carried by said stake for securing said stake and socket to said supporting member.

In testimony whereof I affix my signature.

JAMES A. MOXEY.

Copies of this patent may be obtained for five cents each, by addressing the "Commissioner of Patents, Washington, D. C."